United States Patent

Linn

[11] 4,292,795
[45] Oct. 6, 1981

[54] STRAW AND CHAFF CHOPPER AND SPREADER

[76] Inventor: Orville J. Linn, Box 188, Lang, Saskatchewan, Canada

[21] Appl. No.: 95,671

[22] Filed: Nov. 19, 1979

[51] Int. Cl.³ .............................................. A01D 49/00
[52] U.S. Cl. ...................................... 56/503; 56/14.6; 130/27 R; 130/26
[58] Field of Search ................. 56/503, 504, 505, 208, 56/14.6; 130/27 R, 21, 22, 23, 24, 25, 26

[56] References Cited

U.S. PATENT DOCUMENTS

| | | | |
|---|---|---|---|
| 3,593,719 | 7/1971 | Ashton | 130/21 |
| 3,690,359 | 9/1972 | Wenzel et al. | 130/26 |
| 4,056,107 | 11/1977 | Todd et al. | 130/27 R |
| 4,137,923 | 2/1979 | Druffel et al. | 56/14.6 |
| 4,160,456 | 7/1979 | Hawkins et al. | 130/27 R |

*Primary Examiner*—Robert A. Hafer
*Attorney, Agent, or Firm*—Stanley G. Ade

[57] ABSTRACT

A casing is secured at the rear of the threshing machine underneath the straw discharge thereof. It is provided with a closed base panel and a partially open top panel through which the straw and chaff is fed. In one embodiment, a multi-bladed straw chopper is journalled for rotation within the casing and the blade ends are angulated to create a downdraft within the casing. The straw is chopped by the blades and blown out together with the chaff through apertured wall of the casing. The wall is closed at the rear thereof through approximately 90° with at least one vertical support bar between the upper and lower panels towards the front. In a preferred embodiment, an adjustable divider is situated near the rear of the straw walkers and extends upwardly from the casing so that the straw enters the blades in the front portion and the chaff is drawn in through the rear portion of the casing. In another embodiment, particularly suitable for use with relatively wide combines, a pair of blades are provided in side by side relationship and rotate in opposite directions. These blades are timed so that the blade ends overlap in a common plane.

22 Claims, 9 Drawing Figures

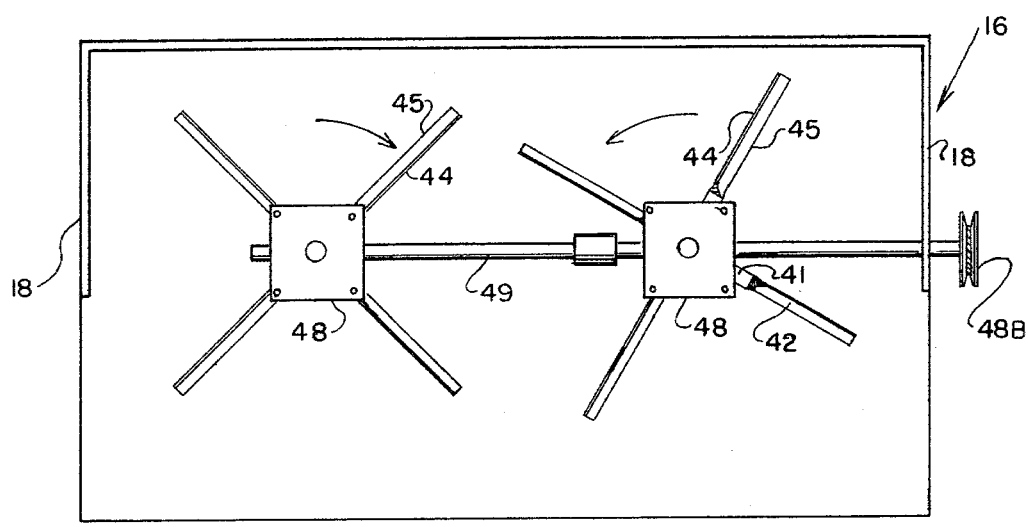
FIG·6
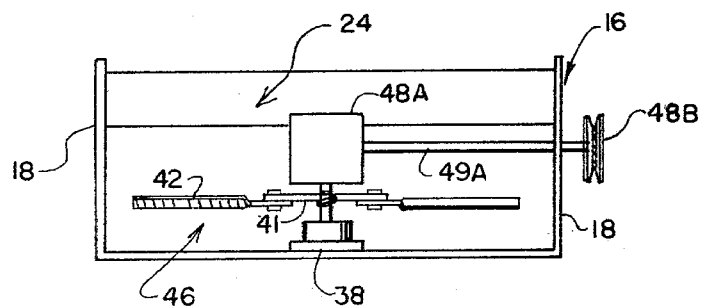
FIG·7

STRAW AND CHAFF CHOPPER AND SPREADER

BACKGROUND OF THE INVENTION

This invention relates to new and useful improvements in straw and chaff chopping and spreading devices, particularly chopping and spreading devices situated below the straw discharge of a threshing machine such as a combine or the like. Conventionally, such devices consist of a transversely situated drum through which the straw is passed and chopped. Obviously with the transversely rotating drum, the straw is spread immediately behind the combine and is not distributed. Alternatively, a horizontally rotating straw spreader is situated below the combine straw outlet which consists of three rubber tipped blades running at relatively low speeds in order to distribute the straw on either side of the combine. This suffers from several disadvantages such as distributing the straw through approximately 360° so that part of the straw is blown or thrown against the rear of the combine with most of the straw being deposited immediately behind the combine instead of being spread upon each side thereof. Furthermore, some of the straw may be thrown back into the combine and interfere with the action of the sieves.

Also, chaff alone, which is also being discharged from the sieves, cannot be spread any great distance on its own because of the lightweight characteristics thereof and with relatively large combines, it is desirable to spread both the straw and the chaff approximately 40 feet upon either side thereof in order to get adequate distribution.

SUMMARY OF THE INVENTION

The present invention overcomes these disadvantages by providing a straw chopping spreader which is adapted to be secured to the combine immediately below the straw discharge means and one aspect of the invention consists of a chopper and spreader for attachment below the straw and chaff discharge of a grain threshing machine such as a combine or the like and adapted to be driven by a source of power on the machine; said chopper and spreader comprising in combination a substantially horizontally located casing securable to said machine below the straw and chaff discharge thereof, straw and chaff intake means on the upper side of the casing operatively connected to the straw and chaff discharge, rotatable straw chopping means journalled for rotation substantially horizontally, in said casing and chopped straw discharge means through at least part of the wall of said casing, said straw chopping means being operatively connectable to the source of power on the associated machine.

Another aspect of the invention, particularly suited for use with relatively wide machines, is to provide a device which includes a pair of rotating straw chopping blades, rotating horizontally in the same plane and having the blades overlapping one another as they rotate and being timed so that there is no contact between the rotating blades. This facilitates the chopping action and prevents a line of unchopped straw being deposited.

A further aspect of the invention in conjunction with the preceding aspect is to provide a chopper and spreader attachment below a straw and chaff discharge of a grain threshing machine such as a combine or the like and which includes a straw walker assembly and a sieve assembly situated spaced forwardly of the chopper and spreader attachment and including a conveyor assembly situated between the rear end of the sieve assembly and the straw and chaff intake means of the chopper and spreader attachment, said conveyor assembly spanning said sieve assembly and inclining upwardly and rearwardly therefrom to convey chaff passing over the rear end of said sieve assembly and depositing same into said intake means.

A still further aspect of the invention is to provide a device of the character herewithin described which is easily attachable to the straw discharge of a threshing machine such as a combine or the like.

Still another aspect of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 6 is a top plan view of FIG. 5 with the transverse divider removed for clarity.

FIG. 7 is a view similar to FIG. 3 but showing an alternative embodiment thereof.

In the drawings like characters of reference indicate corresponding parts in the different figures.

DETAILED DESCRIPTION

Figure 1:
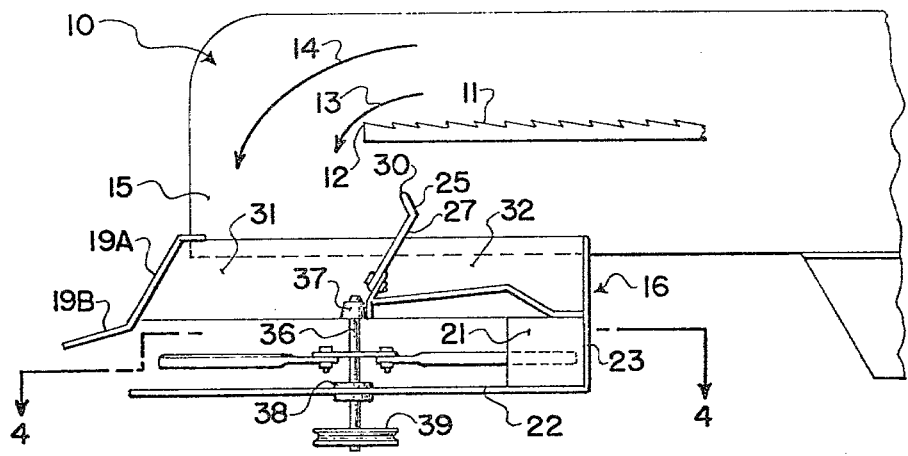
FIG. 1 is a partially sectioned schematic view of the rear end of a combine or the like showing the discharge and the straw chopping and spreading device being secured thereto.
Figure 2:
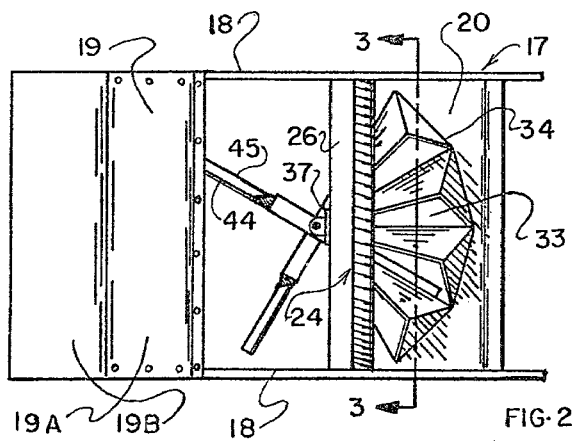
FIG. 2 is a top plan view of the straw chopper and spreader per se.

Proceeding therefore to describe the invention in detail, reference character 10 shows schematically, the rear end of a combine which includes the straw walkers 11 shown schematically which deposits straw over the rear ends 12 thereof in the direction of arrow 13.

Chaff blown from the sieves, usually is discharged rearwardly of the straw and substantially in the direction of arrow 14.

Both the chaff and straw are discharged through the rearwardly situated horizontal discharge opening 15 of the combine.

The invention collectively designated 16 consists of a straw and chaff chopper and spreader which is adapted to be secured to the discharge opening 15 so that all straw and chaff being discharged from the machine 10, passes into and through the device 16.

Dealing first with the embodiment illustrated in FIGS. 1 to 4, the invention consists of a substantially rectangular casing collectively designated 17 including a pair of spaced and parallel side panels 18 and a front panel 19 extending therebetween. This front panel inclines downwardly and forwardly to form the upper portion 19A and then extends at a lesser angle to form the deflector portion 19B acting as a safety shield against stones or other hard objects. The portions 19A and 19B extend below the lower edges of the two side walls or panels 18 with 19A deflecting chopped straw downwardly at this point.

A rear pan 20 extends between the side panels 18 and an arcuately curved wall 21 is situated below the pan 20 and curves around through approximately 90°.

A circular base panel 22 is secured to the lower edge of the arcuately curved wall 21 and extends forwardly therefrom.

A divider panel collectively designated 24 spans the side walls or panels 18 and inclines slightly upwardly and rearwardly and may include the forwardly inclined transversely extending upper edge 25. If desired, this divider includes a fixed base portion 26 and a vertically adjustable upper portion 27 detachably secured to the base portion 26 through slotted apertures 28 and secured by means of wing nuts 29 so that the upper edge 30 of the divider may be adjusted in position as necessary.

This divider divides the casing into a forward straw receiving portion 31 and a rear chaff receiving portion 32 and reference to FIG. 1 will show that the straw, travelling at a relatively low velocity, will enter the casing though the front 31 whereas the chaff, following arrows 14 and being impelled by the wind section of the combine, will be deposited in the rear 32 of the casing. The divider 24 directs the straw to the front section so that it is better engaged by the chopper assembly as will hereinafter be described.

A plurality of angled louvres or deflectors 33 extend between the front edge 34 of the pan 20 and the fixed portion 26 of the divider and these louvres or deflectors are angulated to direct the chaff passing therethrough, into the chopper assembly and in the direction of rotation thereof in order to facilitate efficient distribution of this chaff.

Figure 3:
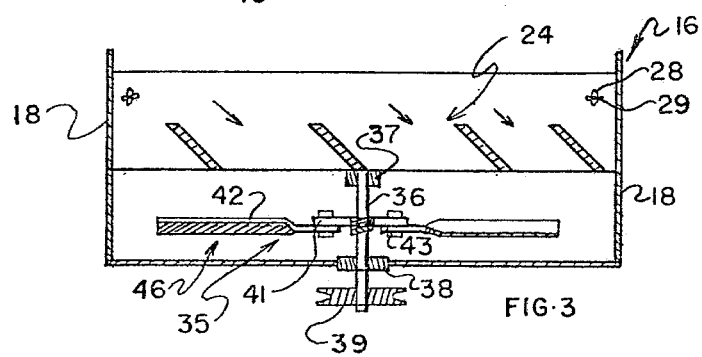
FIG. 3 is a section substantially along the line 3—3 of FIG. 2.
Figure 4:
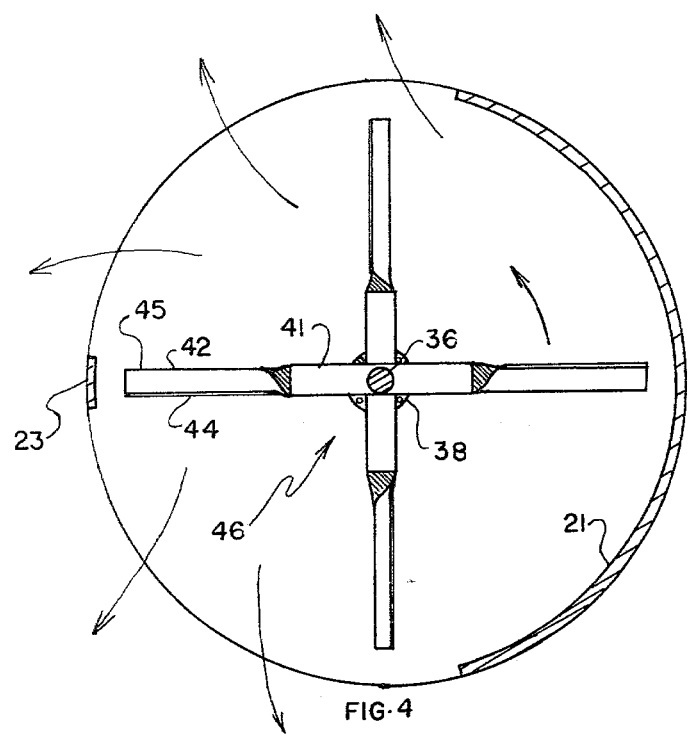
FIG. 4 is a horizontal section substantially along the line 4—4 of FIG. 1.

Situated within the chopper and distributing area defined by the base 22 and the arcuately curved wall 21, is a chopper and distributing assembly collectively designated 35. In FIGS. 3 and 4, a spindle 36 is supported between bearings 37 and 38 and rotated by means of a pulley 39 secured to the lower end thereof and connected by means of a drive belt (not illustrated) to a source of power contained within the threshing machine or combine. However, as such connections are well known for driving auxiliary equipment, it is not believed necessary to show details thereof.

A horizontally mounted multi-bladed fan assembly collectively designated 40 is secured to the spindle and is rotatable thereby, in a horizontal plane, above the base 22 and shrouded to the rear thereof by means of the arcuately curved wall 21.

In the present invention, a pair of cross pieces 41 are secured to the spindle and extend at right angles to one another and chopper and spreader blades 42 are pivotally secured adjacent the extremities of these portions 41, by pivot pin assemblies 43. The blades 42 are twisted so that the leading edges 44, which are edge sharpened, rotate in a plane above the trailing edges 45 thereof.

This creates a down draft when the blade assembly is rotating which facilitates the pulling of the straw downwardly into the rotating chopper blades and also facilitates, together with the louvres 33, the movement of the chaff passing therethrough. The down draft caused by the rotating blades also assists in the discharging of the chaff and chopped straw substantially horizontally to both sides and to the rear, due to the arcutely curved rear wall 21 and the flat planar base 22.

Figure 5:
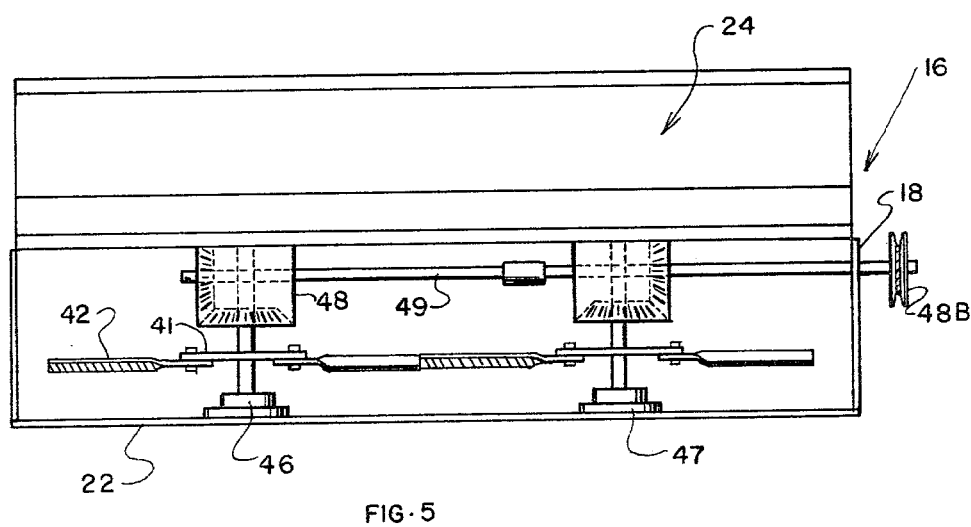
FIG. 5 is a view similar to FIG. 3 but showing a double straw chopper assembly.

In relatively wide combines or threshing machines, a single blade assembly is not practical so that the arrangement shown in FIGS. 5 and 6 may be utilized.

The casing details are similar with the exception that a pair of side by side shafts 46 are supported within bearings 47 secured to the base 22. Gear boxes 48 are mounted to the upperends of shaft 46 and right angled gears (not illustrated) connect these vertical shafts 46 with a horizontal cross shaft 49 which extends through one side wall or panel 18 of the casing and is driven by means of a pulley 48 in a manner similar to the driving of pulley 39.

The shafts 46 contain fixed portions similar to portions 41 with pivoted blades 42 extending therefrom and being angulated as hereinbefore described with reference to the previous embodiment.

However, the blades overlap or are interleaved one set with the other in order to secure complete coverage and, being interconnected by means of the gears and cross shaft 49, may be timed to interleave with one another without actual engagement of the blades as indicated in FIG. 6.

FIG. 7 shows an alternative embodiment to FIGS. 1 to 4 in which the blade or chopper assembly is driven via a gear box 48A similar to gear box 48 and by means of a cross shaft 49A by means of a pulley 48B, with the shaft extending through the side wall 18 as described in the embodiment illustrated in FIGS. 5 and 6.

In all cases, the blades are angulated and edge sharpened on the leading edge thereof to assist in the chopping of the straw and to create the necessary down draft through the casing for the transportation of the chaff and the chopped straw.

Figure 8:
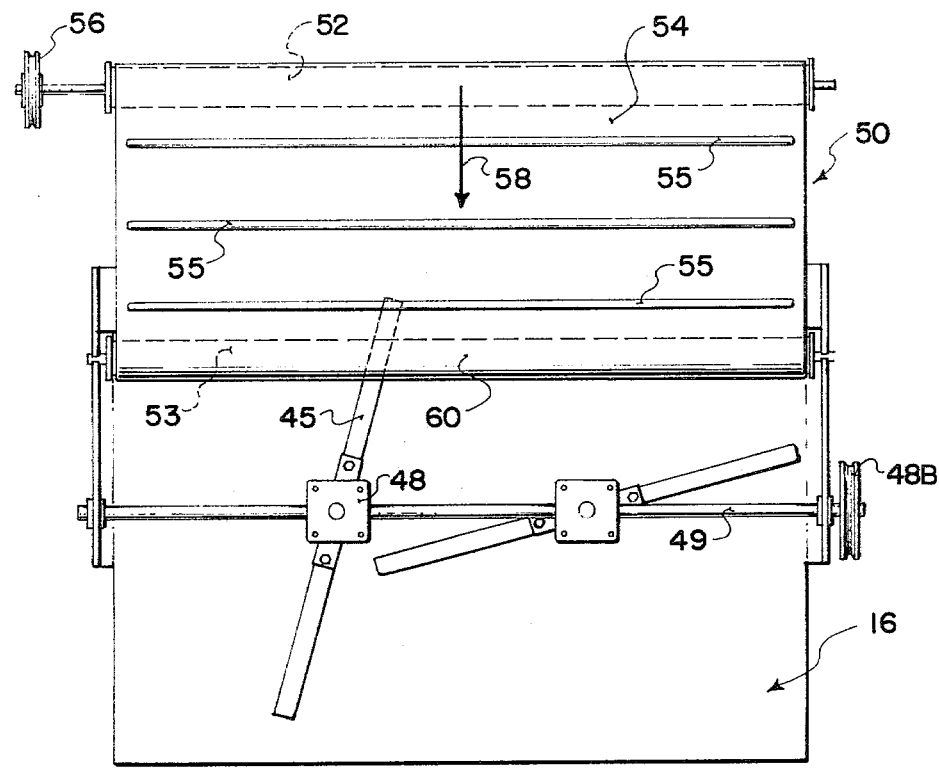
FIG. 8 is a plan view of the preferred embodiment of the device.
Figure 9:
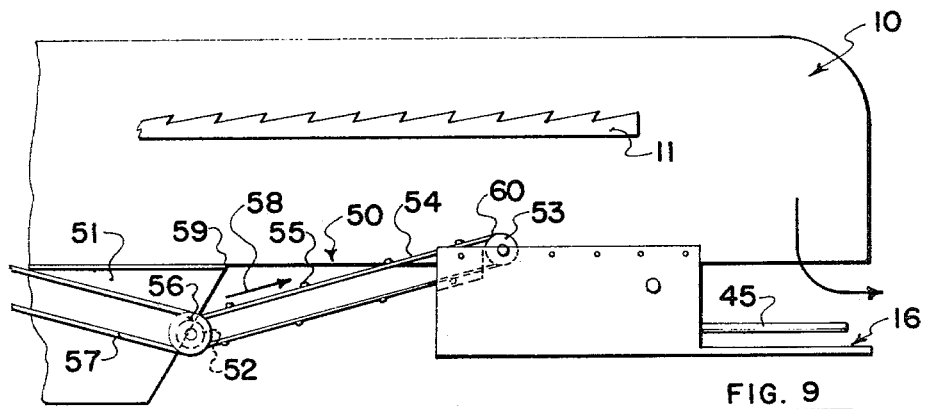
FIG. 9 is a side elevation of the preferred embodiment installed in a combine which is shown schematically and with the side removed for clarity.

FIGS. 8 and 9 show the preferred embodiment. It is shown in use with the double bladed chopper illustrated in FIGS. 5, 6 and 7, but of course it can be used with the embodiment illustrated in FIGS. 1 to 4.

It has been found, particularly on relatively wide combines and the like, that a great deal of the chaff passing over the sieves, is deposited directly behind the combine and is not picked up by the air blowing through the sieves so that distribution of this chaff is concentrated within the track of the swather and is not spread. Therefore, there has been provided a small conveyor collectively designated 50 extending across the width of the sieves illustrated schematically by reference character 51. This conveyor is conventional in construction and includes a front roller 52, a rear roller 53 and an endless belt or draper 54 extending therearound and having spaced and parallel transverse slats 55 secured to the outer surface thereof. It may be driven by a pulley 56 secured to the shaft mounting the front drum 52 with a drive belt 57 extending around the pulley and around any convenient take off location within the combine so that the upper run of the conveyor moves in the direction of arrow 58.

The front drum and hence the front end of the conveyor is situated below the rear end 59 of the sieve assembly and the rear end 60 of the conveyor is situated over the front portion of the intake of the straw chopper as clearly illustrated in FIGS. 8 and 9.

This conveyor 50 catches practically all of the chaff passing over the sieves and not picked up by the wind passing through the sieve assembly.

This chaff is mixed with the straw being chopped and distributed by the blades of the straw chopper and because of this mixing action, it is distributed a much further distance on either side of the machine and relatively evenly over the ground thus preventing undesirable concentrations of chaff component.

Finally, note should be taken of the upper portion 27 of the divider panel collectively designated 24. This divider panel also eliminates chopped straw and chaff being blown backwardly into the combine which would interfere with the action of the sieve assembly and/or straw walkers.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A chopper and spreader for attachment below a straw and chaff discharge of a grain threshing machine such as a combine or the like and adapted to be driven by a source of power on the machine in which said grain threshing machine includes a straw walker assembly and a sieve assembly both situated spaced forwardly of the straw and chaff discharge of the threshing machine; said chopper and spreader comprising in combination a substantially horizontally located casing securable to said machine below the straw and chaff discharge thereof, straw and chaff intake means on the upper side of the casing operatively connected to the straw and chaff discharge, rotatable straw chopping means journalled for rotation substantially horizontally, in said casing and chopped straw discharge means through at least part of the wall of said casing, said straw chopping means being operatively connectable to the source of power on the associated machine, and a transverse divider in the upper side of said casing dividing said straw and chaff intake means into a front straw intake portion and a rear chaff intake portion, said transverse divider being adjustable in height to vary the position of the upper edge thereof relative to said chaff discharge.

2. The invention according to claim 1 in which said casing includes an upper portion attachable to the straw discharge and a lower chopper portion, said lower chopper portion including a chopped straw discharge means through the sides and rear of said chopper portion of said casing.

3. The invention according to claim 1 which includes chaff deflecting louvres spanning said rear portion and to deflect chaff downwardly into said straw chopping means.

4. The invention according to claim 3 in which said chaff deflecting louvres deflect chaff into the direction of rotation of said straw chopping means.

5. The invention according to claim 1 in which said straw chopping means includes a vertical spindle journalled for rotation within said casing, at least one chopping blade assembly secured to said spindle and rotatable therewith, said blade assembly including a plurality of blades, said blades having edge sharpened leading edges, said leading edges lying in a plane above the trailing edges thereof to form chopping blades and fan blades to urge the straw and chaff downwardly in said casing, through said blades and outwardly through said chopped straw discharge means.

6. The invention according to claim 2 in which said straw chopping means includes a vertical spindle journalled for rotation within said casing, at least one chopping blade assembly secured to said spindle and rotatable therewith, said blade assembly including a plurality of blades, said blades having edge sharpened leading edges, said leading edges lying in a plane above the trailing edges thereof to form chopping blades and fan blades to urge the straw and chaff downwardly in said casing, through said blades and outwardly through said chopped straw discharge means.

7. The invention according to claim 3 in which said straw chopping means includes a vertical spindle journalled for rotation within said casing, at least one chopping blade assembly secured to said spindle and rotatable therewith, said blade assembly including a plurality of blades, said blades having edge sharpened leading edges, said leading edges lying in a plane above the trailing edges thereof to form chopping blades and fan blades to urge the straw and chaff downwardly in said casing, through said blades and outwardly through said chopped straw discharge means.

8. The invention according to claim 4 in which said straw chopping means includes a vertical spindle journalled for rotation within said casing, at least one chopping blade assembly secured to said spindle and rotatable therewith, said blade assembly including a plurality of blades, said blades having edge sharpened leading edges, said leading edges lying in a plane above the trailing edges thereof to form chopping blades and fan blades to urge the straw and chaff downwardly in said casing, through said blades and outwardly through said chopped straw discharge means.

9. The invention according to claim 5 which includes a pair of vertical spindles journalled for opposite rotation in said casing and being situated in side by side relationship, a chopping blade assembly secured to each of said spindles, said chopping blade assemblies being in the same plane, the blades of one chopping blade assembly interleaving with the blades of the other chopping blade assembly as they rotate, and means to rotate said blade assemblies in timed relationship with one another.

10. The invention according to claim 7 which includes a pair of vertical spindles journalled for opposite rotation in said casing and being situated in side by side relationship, a chopping blade assembly secured to each of said spindles, said chopping blade assemblies being in the same plane, the blades of one chopping blade assembly interleaving with the blades of the other chopping blade assembly as they rotate, and means to rotate said blade assemblies in timed relationship with one another.

11. The invention according to claims 1, 2 or 3 which includes a conveyor assembly situated between the rear end of the sieve assembly and the straw and chaff intake means of said chopper and spreader attachment, said conveyor assembly spanning said sieve assembly and inclining upwardly and rearwardly therefrom to convey chaff passing over the rear end of said sieve assembly and depositing same into said intake means.

12. The invention according to claims 4, 5 or 6 which includes a conveyor assembly situated between the rear end of the sieve assembly and the straw and chaff intake means of said chopper and spreader attachment, said conveyor assembly spanning said sieve assembly and inclining upwardly and rearwardly therefrom to convey chaff passing over the rear end of said sieve assembly and depositing same into said intake means.

13. The invention according to claims 9 or 7 in which said grain threshing machine includes a straw walker assembly and a sieve assembly situated spaced forwardly of the straw and chaff discharge; and a conveyor assembly situated between the rear end of the sieve assembly and the straw and chaff intake means of said chopper and spreader attachment, said conveyor assembly spanning said sieve assembly and inclining upwardly and rearwardly therefrom to convey chaff passing over the rear end of said sieve assembly and depositing same into said intake means.

14. The invention according to claim 6 which includes a pair of vertical spindles journalled for opposite rotation in said casing and being situated in side by side relationship, a chopping blade assembly secured to each of said spindles, said chopping blade assemblies being in the same plane, the blades of one chopping blade assembly interleaving with the blades of the other chopping blade assembly as they rotate, and means to rotate said blade assemblies in timed relationship with one another.

15. The invention according to claim 6 which includes a pair of vertical spindles journalled for opposite rotation in said casing and being situated in side by side relationship, a chopping blade assembly secured to each of said spindles, said chopping blade assemblies being in the same plane, the blades of one chopping blade assembly interleaving with the blades of the other chopping blade assembly as they rotate, and means to rotate said blade assemblies in timed relationship with one another.

16. The invention according to claims 10, 14, or 15 in which said grain threshing machine includes a straw walker assembly and a sieve assembly situated space forwardly of the straw and chaff discharge; and a conveyor assembly situated between the rear end of the sieve assembly and the straw and chaff intake means of said chopper and spreader attachment, said conveyor assembly spanning said sieve assembly and inclining upwardly and rearwardly therefrom to convey chaff passing over the rear end of said sieve assembly and depositing same into said intake means.

17. The invention according to claim 7 which includes a pair of vertical spindles journalled for opposite rotation in said casing and being situated in side by side relationship, a chopping blade assembly secured to each of said spindles, said chopping blade assemblies being in the same plane, the blades of one chopping blade assembly interleaving with the blades of the other chopping blade assembly as they rotate, and means to rotate said blade assemblies in timed relationship with one another.

18. The invention according to claim 17 in which said grain threshing machine includes a straw walker assembly and a sieve assembly situated spaced forwardly of the straw and chaff discharge; and a conveyor assembly situated between the rear end of the sieve assembly and the straw and chaff intake means of said chopper and spreader attachment, said conveyor assembly spanning said sieve assembly and inclining upwardly and rearwardly therefrom to convey chaff passing over the rear end of said sieve assembly and depositing same into said intake means.

19. A grain threshing assembly such as a combine or the like adapted to be driven by a source of power on the assembly, said grain threshing assembly including a straw walker assembly and a sieve assembly situated spaced forwardly of the straw discharge of the threshing assembly and chopper and spreader attachment situated below said straw and chaff discharge, said chopper and spreader attachment including a substantially horizontally located casing securable to said assembly below the straw and chaff discharge thereof, straw and chaff intake means on the other side of the casing operatively connected to the straw and chaff discharge, rotatable straw chopping means journalled for rotation substantially horizontally, in said casing, chopped straw discharge means through at least part of the wall of said casing, said straw chopping means being operatively connectable to the source of power on the grain threshing assembly, and a conveyor assembly situated between the rear end of the sieve assembly and the straw and chaff intake means of said chopper and spreader attachment, and inclining upwardly and rearwardly therefrom to convey chaff passing the rear end of said sieve assembly, and depositing same into said intake means.

20. The invention according to claim 7 in which said straw chopping means includes a vertical spindle journalled for rotation within said casing, at least one chopping blade assembly secured to said spindle and rotatable therewith, said blade assembly including a plurality of blades, said blades having edge sharpened leading edges, said leading edges lying in a plane above the trailing edges thereof to form chopping blades and fan blades to urge the straw and chaff downwardly in said casing, through said blades and outwardly through said chopped straw discharge means.

21. The invention according to claim 20 which includes a pair of vertical spindles journalled for opposite rotation in said casing and being situated in side by side relationship, a chopping blade assembly secured to each of said spindles, said chopping blade assemblies being in the same plane, the blades of one chopping blade assembly interleaving with the blades of the other chopping blade assembly as they rotate, and means to rotate said blade assemblies in timed relationship with one another.

22. The invention according to claims 19, 20 and 21 in which said transverse divider is adjustable in height to vary the position of the upper edge thereof relative to said chaff discharge.

* * * * *